(12) United States Patent
Chen et al.

(10) Patent No.: US 10,744,817 B2
(45) Date of Patent: Aug. 18, 2020

(54) CENTERLOCK WHEEL ASSEMBLY

(71) Applicant: Revel Wheels, LLC, Baldwin Park, CA (US)

(72) Inventors: Billy Chen, Baldwin Park, CA (US); Paul Yang, Baldwin Park, CA (US); David Tran, Baldwin Park, CA (US)

(73) Assignee: REVEL WHEELS, LLC, Baldwin Park, CA (US)

(*) Notice: Subject to any disclaimer, the term of this patent is extended or adjusted under 35 U.S.C. 154(b) by 185 days.

(21) Appl. No.: 15/861,424

(22) Filed: Jan. 3, 2018

(65) Prior Publication Data

US 2018/0186179 A1 Jul. 5, 2018

Related U.S. Application Data

(60) Provisional application No. 62/442,411, filed on Jan. 4, 2017.

(51) Int. Cl.
| | | |
|---|---|---|
| *B60B 3/14* | (2006.01) | |
| *B60B 7/14* | (2006.01) | |
| *B60B 7/16* | (2006.01) | |

(52) U.S. Cl.
CPC .............. *B60B 7/14* (2013.01); *B60B 3/142* (2013.01); *B60B 3/147* (2013.01); *B60B 7/16* (2013.01); *B60B 3/145* (2013.01); *B60B 2900/541* (2013.01)

(58) Field of Classification Search
CPC ............ B60B 3/14; B60B 3/142; B60B 3/147
See application file for complete search history.

(56) References Cited

U.S. PATENT DOCUMENTS

| | | | | |
|---|---|---|---|---|
| 4,478,458 A | * | 10/1984 | Flexman | B60B 3/14 301/35.57 |
| 5,492,391 A | * | 2/1996 | Snook | B60B 1/042 301/105.1 |
| 5,584,537 A | * | 12/1996 | Miansian | B60B 3/142 301/105.1 |
| 5,601,343 A | * | 2/1997 | Hoffken | B60B 1/06 301/111.04 |
| 5,636,905 A | * | 6/1997 | Pagacz | B60B 3/142 301/35.58 |
| 5,887,952 A | * | 3/1999 | Gandellini | B60B 3/02 301/35.58 |

(Continued)

*Primary Examiner* — Jason R Bellinger
(74) *Attorney, Agent, or Firm* — Kevin Schraven; Anooj Patel; Hankin Patent Law, APC (57) ABSTRACT

An apparatus and a method are provided for a centerlock wheel assembly that is configured to improve driving dynamics and provide faster wheel changes. A centerlock adaptor is provided with a plurality of vehicle bolt pattern configurations disposed thereon. A first and threaded abutment are disposed on the centerlock adaptor. A hub adaptor is configured to threadingly engage with an exterior surface of the threaded abutment, thereby retaining a centerlock wheel, for example. Finally, a center cap is provided to threadingly engage with an inner surface of the threaded abutment. For each side of the vehicle, the centerlock assembly features particular threading arrangements so as to retain the centerlock wheel and counteract against various wheel dynamics. A centerlock wrench is provided to tighten and loosen the hub adaptor and center cap.

5 Claims, 5 Drawing Sheets

(56) References Cited

U.S. PATENT DOCUMENTS

| | | | | |
|---|---|---|---|---|
| 6,626,502 B1* | 9/2003 | Petrak | ............... | B60B 3/147 |
| | | | | 301/35.629 |
| 7,922,258 B2* | 4/2011 | Baumann | ............... | B60B 3/142 |
| | | | | 301/111.01 |
| 8,291,795 B2* | 10/2012 | Hughes | ............... | B25B 15/005 |
| | | | | 81/460 |
| 10,112,436 B2* | 10/2018 | Denmead | ............... | B60B 3/14 |
| 2013/0020855 A1* | 1/2013 | Becker | ............... | B60B 3/165 |
| | | | | 301/35.63 |
| 2013/0047797 A1* | 2/2013 | Lukes | ............... | F16B 23/003 |
| | | | | 81/460 |

\* cited by examiner

CENTERLOCK WHEEL ASSEMBLY

CROSS-REFERENCE TO RELATED APPLICATIONS

This application claims the benefit of priority of U.S. Provisional Application No. 62/442,411, filed Jan. 4, 2017.

FIELD

The field of the present disclosure generally relates to vehicle wheel assemblies. More particularly, the field of the invention relates to an apparatus and a method for a centerlock wheel assembly that is configured to improve driving dynamics and provide faster wheel changes.

BACKGROUND

Vehicles of many different types enjoy an enthusiastic following because of their baseline design and style. Many vehicle manufacturers produce special edition vehicles and types, including for example, off-road and higher horsepower models. However, for certain vehicle owners and enthusiasts, special editions are not enough. To be sure, for this cross-section of enthusiasts, aftermarket modifications are very desirable so that their vehicles can be a truer reflection of themselves.

In an effort to modify their vehicles, many aspects of the vehicle may be upgraded or changed. For example, to increase horsepower, the engine may be modified with more robust internals. For aesthetics and improved aerodynamics, different bumpers, spoilers and other body modifications may be performed to the vehicle.

In certain cases, the wheels and tires of a vehicle may also be changed, so as to dramatically change the appearance of the vehicle, and also provide desirable improvements in performance and handling. Consequently, wheels and tires become the foremost target for thieves. Furthermore, upgrading ones wheels and tires to lighter variants is a popular modification as it desirably reduces the vehicle's unsprung weight so as to improve handling characteristics of the vehicle.

Unfortunately, changing one's wheels and tires has a number of drawbacks as compared to the other modifications mentioned herein. For example, as compared to engine performance modifications, one's wheels and tires are more susceptible to theft as they are outwardly visible and easy to remove from a parked vehicle. Indeed, with a simple wrench, traditional wheel and tires may be easily removed from a vehicle in a matter of minutes. Although bumpers and aerodynamics are traditionally disposed on the outside of the vehicle, they are more difficult to remove and often times less valuable than wheels and tires. Furthermore, traditional wheels and tires utilize well-known types of lug nuts, and thus, any thief may purchase a single wrench to remove many types of wheels and tires, independent of the vehicle in question.

Finally, wheels and tires utilize a plurality of lug nuts so as to couple the wheel to the hub of the vehicle. From the vehicle owner or user's perspective, this means that often times, 4, 5, 6 or 8 lug nuts need to be removed from each wheel, thereby requiring an undesirable amount of time and effort to remove a wheel. What is needed, therefore, is an apparatus and a method for a wheel assembly that is configured to improve driving dynamics, reduce theft, and provide faster wheel changes.

SUMMARY OF THE INVENTION

The present invention describes an apparatus and method for a centerlock wheel assembly. The centerlock wheel assembly is presumed to be configured such that it may improve driving dynamics and provide faster wheel changes. Additionally, it is contemplated that the centerlock wheel is more aesthetically pleasing and may provide additional structural rigidity to a vehicle that it is equipped therewith. A centerlock adaptor is provided with a plurality of vehicle bolt pattern configurations disposed thereon. A first and threaded abutment are disposed on the centerlock adaptor. A hub adaptor is configured to threadingly engage with an exterior surface of the threaded abutment, thereby retaining a centerlock wheel, for example. Finally, a center cap is provided to threadingly engage with an inner surface of the threaded abutment. For each side of the vehicle, the centerlock assembly features particular threading arrangements so as to retain the centerlock wheel and counteract against various wheel dynamics. A centerlock wrench is provided to tighten and loosen the hub adaptor and center cap.

In an exemplary embodiment of the present invention a centerlock wheel assembly is provided comprising a centerlock adaptor configured with a plurality of bolt patterns, a flange, and a threaded abutment, the threaded abutment configured to threadingly engage with an interior surface of a hub adaptor. Additionally, the centerlock adaptor is configured to receive a center-locking wheel on the threaded abutment. The hub adaptor is configured to retain the center-locking wheel and a center cap is configured to mate with an inner surface of the hub adaptor.

In still another exemplary embodiment, the centerlock wheel assembly has a plurality of teeth are formed on the hub adaptor.

In yet another exemplary embodiment, the centerlock wheel assembly has a recessed gear is formed on the center cap.

Yet another exemplary embodiment of the invention is to provide a centerlock wheel assembly that has a threaded abutment that comprises an outer surface featuring a left handed thread pattern, and an inner surface that features a right handed thread pattern.

Still another exemplary embodiment is a centerlock wheel assembly having a threaded abutment of the centerlock adaptor comprising an outer surface featuring a right handed thread pattern, and an inner surface that features a left handed thread pattern.

In an exemplary embodiment of the invention, the centerlock wheel assembly has an inner surface of the hub adaptor features a right handed thread pattern.

In another exemplary embodiment, the centerlock wheel assembly has an inner surface of the hub adaptor features a left handed thread pattern.

In yet another exemplary embodiment, the centerlock wheel assembly has a center cap featuring a male threaded portion configured with a left hand threaded pattern.

Still another exemplary embodiment of the invention is a centerlock wheel assembly wherein the center cap features a male threaded portion configured with a right hand threaded pattern.

In an exemplary embodiment, the centerlock wheel assembly further comprises a centerlock wrench comprising a proximal face that features a plurality of ridges that are configured to mate the teeth of the hub adaptor, and a distal face comprising a protruding gear that is configured to mate with the recessed gear of the center cap.

Still another exemplary embodiment of the present invention is to provide a centerlock wheel assembly having a centerlock adaptor configured with a bolt pattern, a flange comprising a plurality of bores, and a threaded abutment, the threaded abutment configured to threadingly engage with an interior surface of a hub adaptor. The centerlock adaptor may be configured to receive a center-locking wheel on the threaded abutment and a hub adaptor configured to retain the center-locking wheel. The centerlock also has a center cap configured to mate with an inner surface of the hub adaptor.

In another exemplary embodiment, the centerlock wheel assembly has a plurality of teeth are formed on the hub adaptor, and wherein a recessed gear is formed on the center cap.

In yet another exemplary embodiment, the centerlock wheel assembly has a threaded abutment that comprises an outer surface featuring a left handed thread pattern, and an inner surface that features a right handed thread pattern.

Still another exemplary embodiment is a centerlock wheel assembly having a threaded abutment of the centerlock adaptor comprising an outer surface featuring a right handed thread pattern, and an inner surface that features a left handed thread pattern.

Another exemplary embodiment is a centerlock wheel assembly having an inner surface of the hub adaptor featuring a right handed thread pattern.

In another exemplary embodiment, the centerlock wheel assembly has an inner surface of a hub adaptor that features a left handed thread pattern.

In an exemplary embodiment, the centerlock wheel assembly has a center cap feature having a male threaded portion configured with a left hand threaded pattern.

Yet another exemplary embodiment is a centerlock wheel assembly wherein the center cap features a male threaded portion configured with a right hand threaded pattern.

In yet another exemplary embodiment of the present invention, a centerlock wheel assembly is provided wherein the centerlock adaptor is configured with a plurality of bolt patterns, a flange, and a threaded abutment, the threaded abutment configured to threadingly engage with an interior surface of a hub adaptor. Additionally, the centerlock adaptor is configured to extend through a center bore of a center-locking wheel and the hub adaptor is configured to fasten to a portion of the centerlock adaptor extending through the center locking wheel, a plurality of teeth being formed on the hub adaptor. The centerlock also has a center cap configured to mate with an inner surface of the hub adaptor, the center cap comprising a recessed gear formed thereon. Moreover, a centerlock wrench comprising a proximal face that features a plurality of ridges that are configured to mate the teeth of the hub adaptor, and a distal face comprising a protruding gear that is configured to mate with the recessed gear of the center cap.

BRIEF DESCRIPTION OF THE DRAWINGS

The drawings refer to embodiments of the present disclosure in which.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for a centerlock wheel assembly that is configured to improve driving dynamics and provide faster wheel changes. A centerlock adaptor is provided with a plurality of vehicle bolt pattern configurations disposed thereon. A flange and a threaded abutment are disposed on the centerlock adaptor. A hub adaptor is configured to threadingly engage with an exterior surface of the threaded abutment, thereby retaining a centerlock wheel, for example. Finally, an opposite-direction, locking center cap is included to engage with an inner surface of the threaded abutment of the centerlock adaptor. Depending on the side of the vehicle, the components of the centerlock assembly feature particular threading arrangements so as to retain the centerlock wheel and provide additional safety. A centerlock wrench is provided to tighten and loosen the hub adaptor and center cap.

In one embodiment, a centerlock wheel assembly is disclosed, comprising: a centerlock adaptor configured with a plurality of bolt patterns, a flange, and a threaded abutment, the threaded abutment configured to threadingly engage with an interior surface of a hub adaptor; the centerlock adaptor configured to receive a center-locking wheel on the threaded abutment; the hub adaptor configured to retain the center-locking wheel; and a center cap configured to mate with an inner surface of the hub adaptor.

In one embodiment, a plurality of teeth are formed on the hub adaptor. In another embodiment, a recessed gear is formed on the center cap. In yet another embodiment, the threaded abutment of the comprises an outer surface featuring a left handed thread pattern, and an inner surface that features a right handed thread pattern. In one embodiment, the threaded abutment of the centerlock adaptor comprises an outer surface featuring a right handed thread pattern, and an inner surface that features a left handed thread pattern. In another embodiment, an inner surface of the hub adaptor features a right handed thread pattern.

In yet another embodiment, an inner surface of the hub adaptor features a left handed thread pattern. In one embodiment, the center cap features a male threaded portion configured with a left hand threaded pattern. In another embodiment, the center cap features a male threaded portion configured with a right hand threaded pattern. In yet another embodiment, a centerlock wrench comprising a proximal face that features a plurality of ridges that are configured to mate the teeth of the hub adaptor, and a distal face comprising a protruding gear that is configured to mate with the recessed gear of the center cap.

In one embodiment, a centerlock wheel assembly is disclosed, comprising: a centerlock adaptor configured with a bolt pattern, a flange comprising a plurality of bores, and a threaded abutment, the threaded abutment configured to threadingly engage with an interior surface of a hub adaptor; the centerlock adaptor configured to receive a center-locking wheel on the threaded abutment; the hub adaptor configured to retain the center-locking wheel; and a center cap configured to mate with an inner surface of the hub adaptor. In one embodiment, a plurality of teeth are formed on the hub adaptor, and wherein a recessed gear is formed on the center cap. In another embodiment, the threaded abutment of the comprises an outer surface featuring a left handed thread pattern, and an inner surface that features a right handed thread pattern.

In yet another embodiment, the threaded abutment of the centerlock adaptor comprises an outer surface featuring a right handed thread pattern, and an inner surface that features a left handed thread pattern. In one embodiment, an inner surface of the hub adaptor features a right handed thread pattern. In another embodiment, an inner surface of the hub adaptor features a left handed thread pattern. In one embodiment, the center cap features a male threaded portion configured with a left hand threaded pattern. In yet another embodiment, the center cap features a male threaded portion configured with a right hand threaded pattern.

In one embodiment, a centerlock wheel assembly is disclosed, comprising: a centerlock adaptor configured with a plurality of bolt patterns, a flange, and a threaded abutment, the threaded abutment configured to threadingly engage with an interior surface of a hub adaptor; the centerlock adaptor configured to extend through a center bore of a center-locking wheel; the hub adaptor configured to fasten to a portion of the centerlock adaptor extending through the center locking wheel, a plurality of teeth being formed on the hub adaptor; a center cap configured to mate with an inner surface of the hub adaptor, the center cap comprising a recessed gear formed thereon; and a centerlock wrench comprising a proximal face that features a plurality of ridges that are configured to mate the teeth of the hub adaptor, and a distal face comprising a protruding gear that is configured to mate with the recessed gear of the center cap.

Figures 1A, 1B:
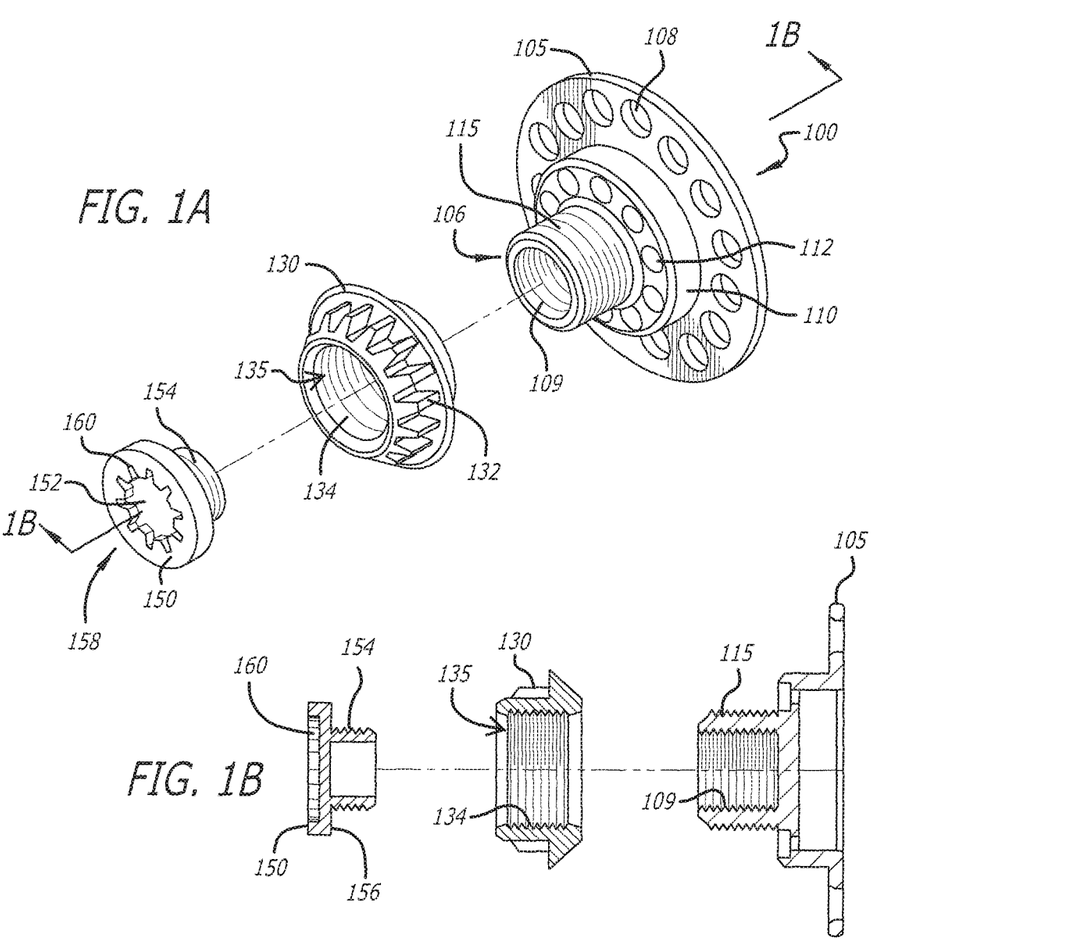
FIGS. 1A-1C illustrate various view of a right-sided centerlock wheel assembly in accordance with embodiments of the disclosure.
Figure 1C:
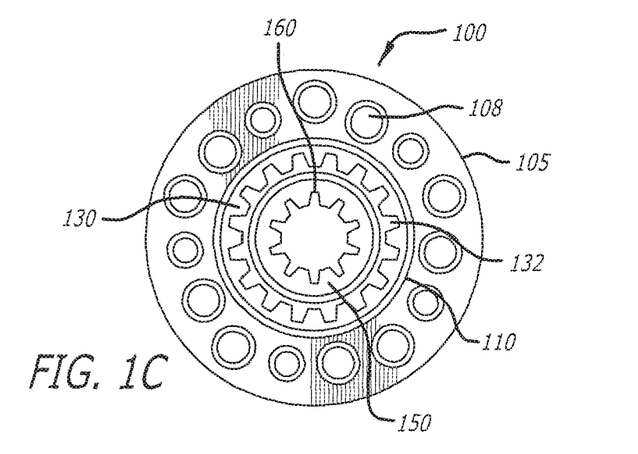

FIGS. 1A-1C illustrate various view of a right-sided centerlock assembly in accordance with one embodiment of the disclosure. Referring specifically to FIG. 1A, an exploded view of the centerlock assembly 100 is shown. In one embodiment, the centerlock adaptor 105 features a plurality of bolt holes 108 that are configured as bolt patterns to mate with a plurality of various vehicles. Although the centerlock adaptor 105 is shown with numerous bolt patterns, it is contemplated that the centerlock adaptor 105 may be configured with only one bolt pattern, perhaps specifically for a certain original equipment manufacturer ("OEM"). Thus, in one embodiment, only 3, only 4, only 5 or only 6 bolt holes 108 are disposed on the centerlock adaptor 105. It is to be appreciated that the exact configuration of the bolt pattern will vary depending on the application.

As shown in FIG. 1A, the general purpose of the centerlock adaptor 105 is to provide a universal solution to the numerous bolt patterns, sizes and specifications that are made available by various OEMs. As discussed herein, the bolt pattern of a wheel refers to the number of bolt holes 108 and the diameter of the circles defined thereby. For example, a 5×4.5" bolt pattern would inform the user that a wheel with 5 lugs is required, which are disposed evenly on a circle featuring a 4.5" diameter. In embodiments, the bolt patterns may include, by way of non-limiting example, 4×130 mm; 5×112 mm; 5×120 mm; 5×134 mm; 5×135 mm, 5×205 mm, 5×4.5", 5×5", 5×5.5", 6×135 mm, 6×4.5", 6×5.5", 8×6.5" and 8×170 mm. It is envisioned that the centerlock adaptor 105 will be configured to accept various lug nut types, including, for example, acorn/tapered, flange/flat and ball/rounded styles. It is envisioned that any bolt pattern may be disposed on the centerlock adaptor 105 without exceeding beyond the spirit and scope of the present disclosure. In one embodiment, the bolt holes 108 may be described, noted, or otherwise inscribed on the centerlock adaptor 108, thereby providing an intuitive guide to the user for the purposes of installation. In one embodiment, the diameter and length of the threaded abutment 115 may be varied depending on the application. In one embodiment, the threaded abutment 115 is configured to provide a hub centric fitment with respect to the vehicle.

Referring still to FIG. 1A, a flange 110 is disposed on the centerlock adaptor 105. The exact width of the flange 110 may be varied depending on the application. In one embodiment, the flange 110 is configured so as to provide clearance from lug nuts that are utilized with respect to the bolt holes 108. In one embodiment, the flange 110 features a plurality of bores 112 so as to aid in desirably reducing overall weight of the centerlock wheel assembly 100. For example, the centerlock adaptor 105 may be comprised of billet aluminum. In one embodiment, the centerlock adaptor 105 is comprised exclusively of "6061-T6" billet aluminum. It should be appreciated that the material choices and bores 112 may desirably lower a vehicle's unsprung weight. Although the unsprung weight of a vehicle is largely a function of the design of the vehicle's suspension and the materials used in the construction of suspension components, a lower unsprung weight is desirable, especially for high-performance applications.

The hub adaptor 130 features a plurality of teeth 132 disposed thereon, which are configured to mate with a wrench 300 which is described in greater detail below. In one embodiment, the hub adaptor 130 functions as a locking nut. As shown, the hub adaptor 130 features an inner surface 134 that is threaded in a particular orientation, depending on the side of the vehicle that the centerlock assembly 100 is installed. For example, if the centerlock assembly 100 is installed on the right side of the vehicle, then the inner surface 134 may feature a left-handed thread pattern. In one embodiment, the thread pattern is specifically configured as a M48×3 pattern. The thread pattern orientations may be directionally reversed in one embodiment. As shown in FIG. 1A, the inner surface 134 of the hub adaptor 130 is configured to threadingly engage with the outer surface 106 of the threaded abutment 115, which features a left-handed thread pattern. In one embodiment, the outer surface 106 of the centerlock adaptor 105 is specifically configured as a M48×3 pattern. It should be understood that the thread patterns and specific dimensions of the inner surface 134 and outer surface 106 are configured in commensurate size and shape so as to maximize retention and fastening. In one embodiment, the outer surface 106 may be configured with an external male thread to mate with an internal female thread on the inner surface 134 of the hub adaptor 130.

Referring still to FIG. 1A, a center cap 150 is shown. The center cap 150 may feature a logo or other stylistic element 152 disposed thereon. In one embodiment, a logo may be etched or milled on the surface of the center cap 150. The center cap 150 may be anodized, chromed or powder coated in any color without exceeding beyond the spirit and scope of the disclosure. Although shown as a circle, the center cap 150 may be produced in any of various shapes without limitation. The center cap 150 also features a male threaded portion 154 that is configured to mate with an inner surface 109 of the centerlock adaptor 105. The inner surface 109 may feature a right-handed or left-handed thread pattern (depending on the orientation of the vehicle) so as to threadingly engage with an inner surface 109 of the centerlock 105. Preferably, as shown in FIG. 1B, the lip 156 of the center cap 150 seats substantially adjacent the recess 135 of the hub adaptor 130, after the hub adaptor 130 has been installed with respect to the centerlock adaptor 105. The recess 135 may be chamfered in embodiments. In embodiments, however, the center cap 150 may protrude from the hub adaptor 130 when installed. In one embodiment, the exterior facing surface 158 of the center cap 150 features a recessed gear 160 that is configured to operate with the gear 315 of the centerlock wrench 300 as discussed further below.

Of particular note with respect to FIGS. 1A-1C is that specific thread patterns are disposed on various inner and exterior surfaces of the centerlock adaptor 105, hub adaptor 130, and center cap 150. It should be understood that these thread patterns are configured to counteract the vehicle's direction of motion, and various wheel dynamics, including by way of non-limiting example, engine torque, brake torque, tire tractive force, wheel friction force, normal reaction force from the ground, and gravity force. In one embodiment, the centerlock assembly 100 is configured so that the various elements described herein do not loosen or disengage with normal use of the vehicle.

More specifically, the exterior surface 106 of the centerlock adaptor 105 features a helix 107 that can twist in two possible directions, depending on the configuration that is specific to a particular side of a vehicle. In one embodiment, the helix 107 is oriented so that the threaded exterior surface 106, when seen from a point of view on an axis through the center of the helix 107, moves away from the viewer when it is turned in a clockwise direction, and moves towards the viewer when it is turned counterclockwise. This may be referred to as a right-handed thread, because it follows the right hand grip rule. It will be appreciated that threads oriented in the opposite direction are known as left-handed. The cross-sectional shape of the thread may be referred to as its form or threadform, and they may be square, triangular, trapezoidal, or any other shape. The terms form and threadform may sometimes refer to all design aspects taken together (cross-sectional shape, pitch, and diameters). The angle characteristic of the cross-sectional shape is often called the thread angle. For most V-threads, this is standardized as 60 degrees, but any angle may be used without exceeding beyond the spirit and scope of the present disclosure.

In one embodiment, the center cap 150 includes an external male threaded portion 154 that may be right-handed or left-handed depending on the orientation when installed on a vehicle. Similarly, the centerlock adaptor 105 features an external male threaded abutment 115 that may be right-handed or left-handed depending on the orientation when installed on a vehicle. It should be understood that commensurate, female-threaded portions are disposed or otherwise formed on inner surface 134 of the hub adaptor 130 and inner surface 109 of the centerlock adaptor 105. Similarly, FIG. 1B illustrates a cross-sectional view of the centerlock assembly 100. It should be appreciated that the centerlock adaptor 105 may be configured with a specific offset and backspacing so as to yield perfect fitment with respect to any vehicle. Thus, the thickness and overall dimensions of the centerlock wheel assembly 100 may be varied depending on the application. FIG. 1C illustrates a plan view of the center lock assembly 100, without a wheel installed thereon. As shown in FIG. 1C, the centerlock wheel assembly 100 comprises a plurality of interconnecting components that function together so as to desirably retain a center-locking wheel.

Figures 2A, 2B:
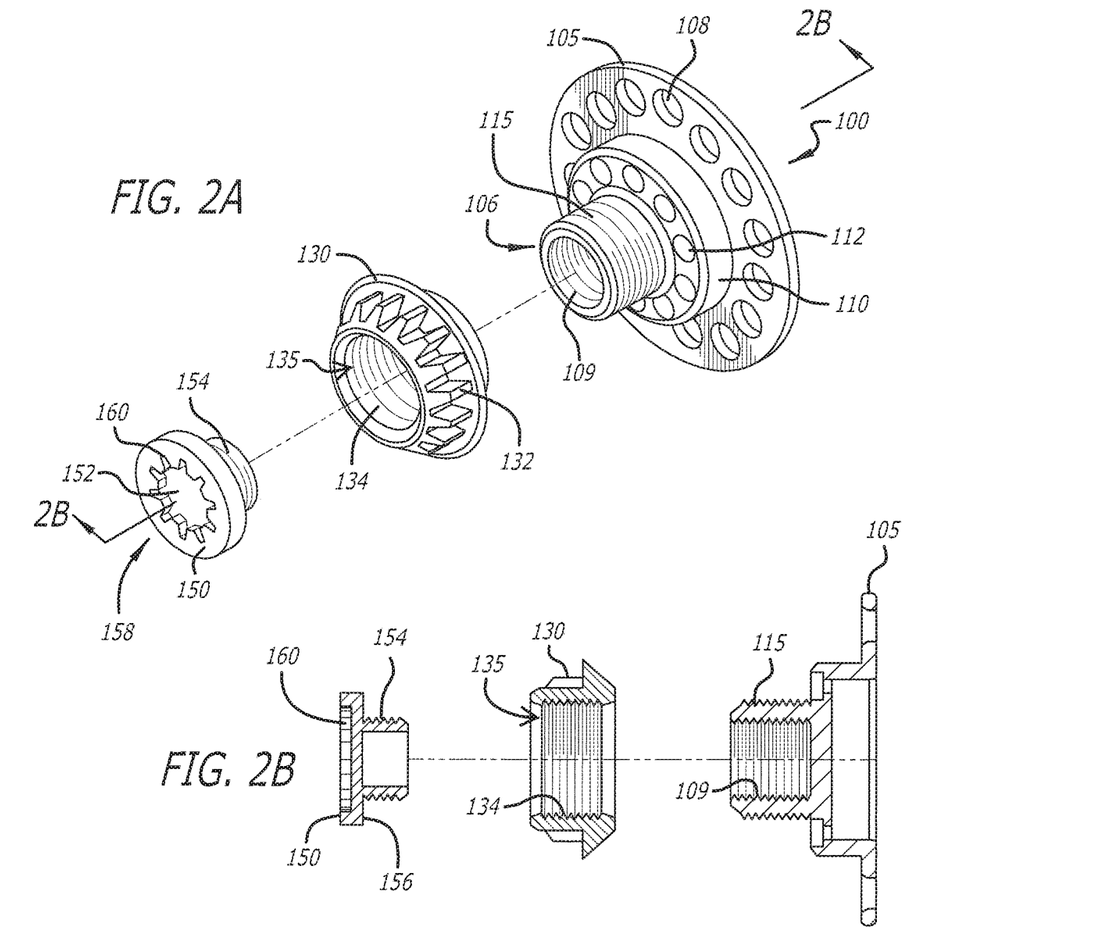
FIG. 2A-2C illustrate various views of a left-sided centerlock wheel assembly in accordance with embodiments of the disclosure.
Figure 2C:
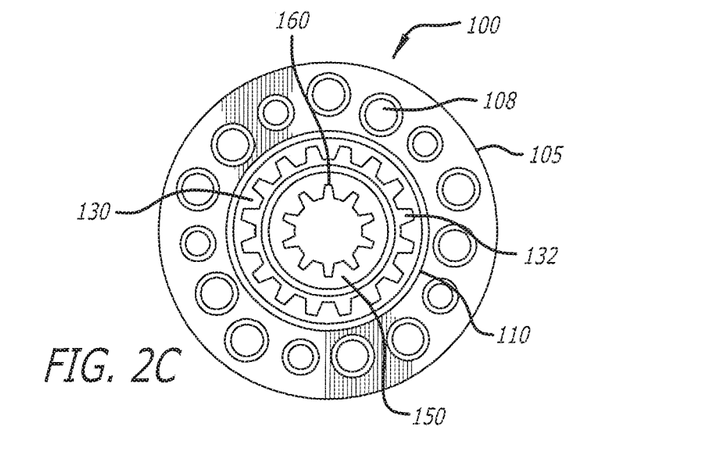

FIG. 2A-2C illustrate various views of a centerlock assembly 100 that are substantially similar to the one described herein with respect to FIGS. 1A-1C, except that the centerlock assembly 100 is installed on the left side of the vehicle. Indeed, the centerlock assembly 100 of FIGS. 2A-2C is identical to the right side centerlock assembly 100, except that when the centerlock assembly 100 is installed on the left-side of the vehicle, the threaded patterns are configured in the opposite direction. For example, on the right side centerlock assembly 100 described with respect to FIGS. 1A-1C, the threaded abutment 115 of the centerlock adaptor 105 features an outer surface 106 that features a left handed thread pattern, and an inner surface 109 that features a right handed thread pattern. However, when the centerlock assembly 100 is installed on the left side of the vehicle—as described with respect to FIGS. 2A-2C, the threaded abutment 115 of the centerlock adaptor 105 features an outer surface 106 that features a right handed thread pattern, and an inner surface 109 that features a left handed thread pattern. Similarly, with respect to FIGS. 2A-2C, the inner surface 134 of the hub adaptor 130 features a right hand thread pattern. Finally, the center cap 150 features a male threaded portion 154 configured with a left hand threaded pattern.

Figure 3A:
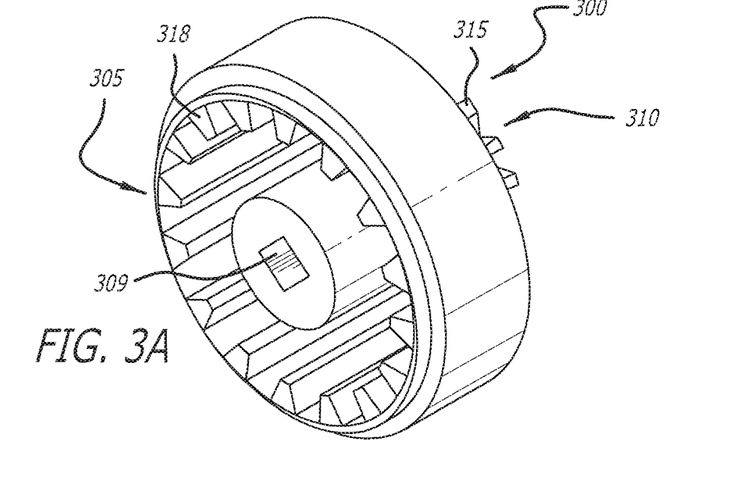
FIGS. 3A-3D illustrate various views of a centerlock wrench in accordance with embodiments of the disclosure.
Figure 3B:
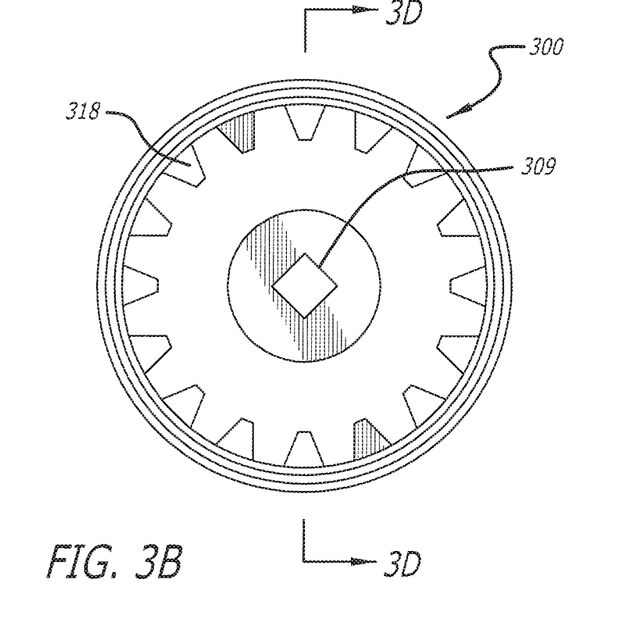
Figure 3C:
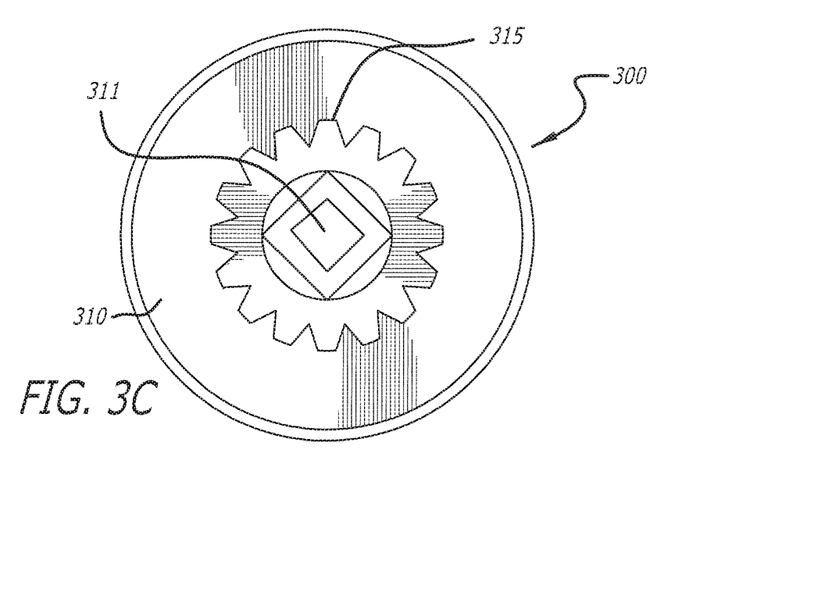
Figure 3D:
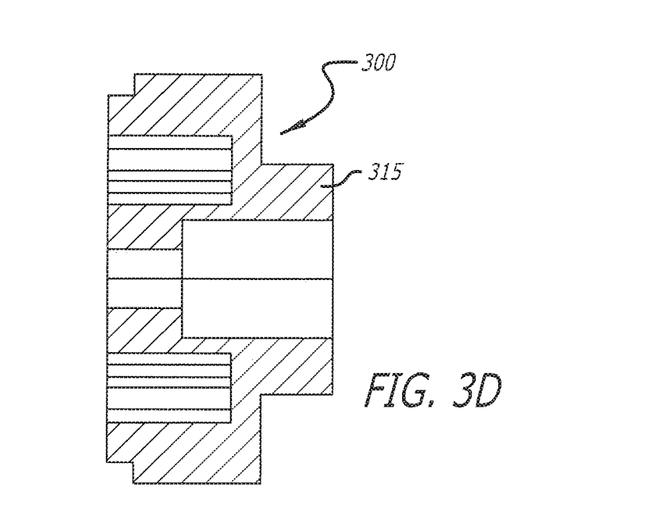

FIGS. 3A-3D illustrate various views of a centerlock wrench 300 according to one embodiment of the disclosure. As shown in FIG. 3A, the wrench 300 features a proximal face 305, and distal face 310. In one embodiment, the proximal face 305 is substantially hollow, except for a plurality of pronounced ridges 318 that are configured so as to couple with the teeth 132 of the hub adaptor 130, for example. The size, shape and quantity of the ridges 318 may vary depending on the teeth 132 of the hub adaptor 130. As shown in FIG. 3B, at the center of the centerlock wrench 300, a socket driving region 309 is provided so as to receive a socket from a torque wrench, for example. In one embodiment, a ⅜" drive is contemplated, although any other sizes and dimensions may be utilized without exceeding beyond the spirit and scope of the present disclosure. Referring now to FIG. 3C, in one embodiment, the distal face 310 features a protruding gear 315 that is configured to mate with the recessed gear 160 of the center cap 150. At the center of the distal face 310, a second socket driving region 311 is provided so as to receive a socket from a torque wrench, for example. It is contemplated that the centerlock wrench 300 is configured for a plurality of purposes, including at least tightening and installing, or loosening and removing the hub adaptor 130; and tightening and installing, or loosening and removing the center cap 150. In one embodiment, the centerlock wrench is comprised of billet aluminum, although any other material may be utilized, without limitation.

Figure 4:
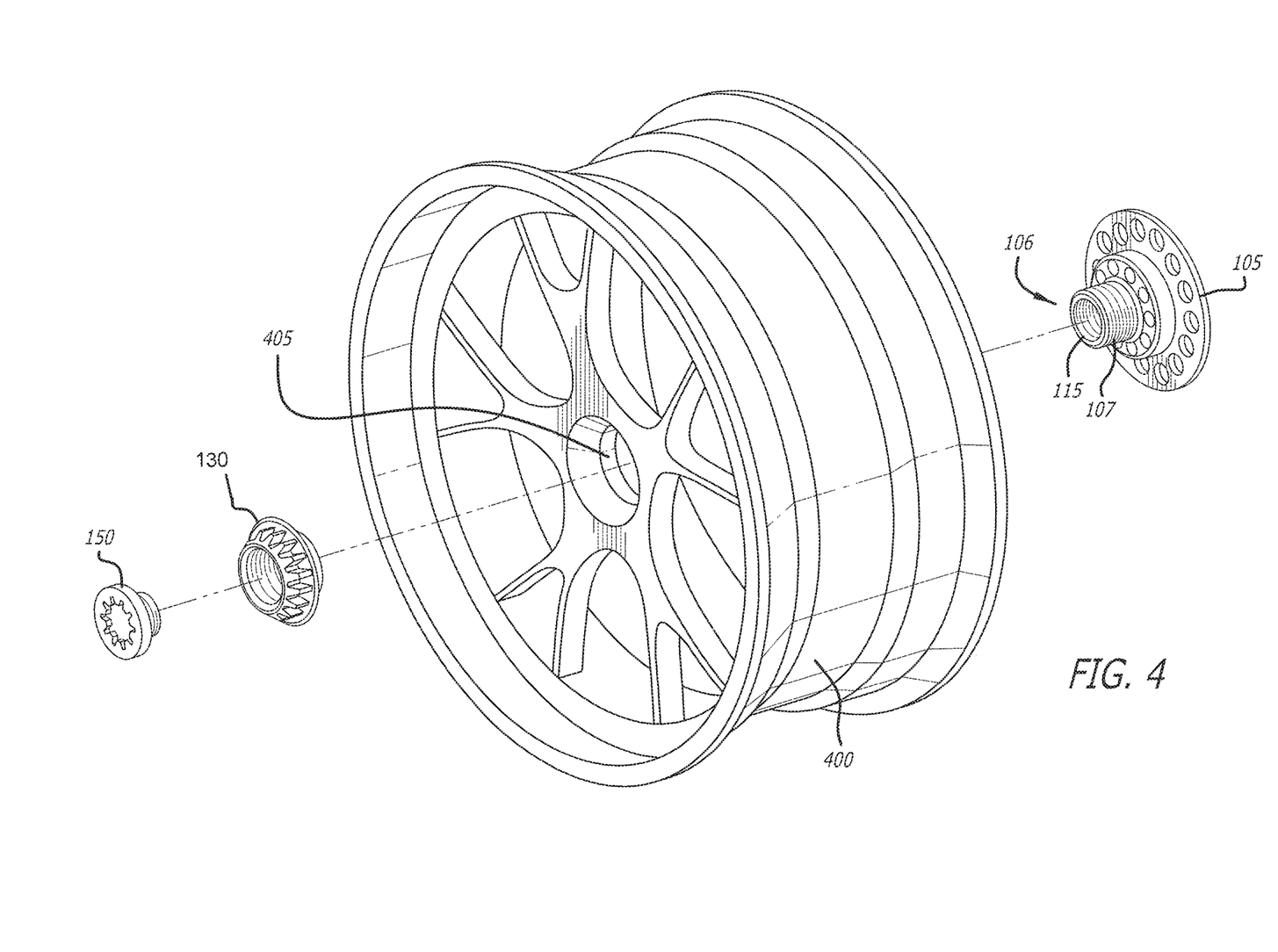
FIG. 4 illustrates an exploded view of the centerlock wheel assembly in conjunction with an exemplary vehicle wheel.

FIG. 4 illustrates an exploded view of the centerlock wheel assembly, in conjunction with a center locking wheel 400. As shown with respect to FIG. 4, the exterior surface 106 features a helix 107 that can twist in two possible directions, depending on the configuration that is specific to a particular side of a vehicle. The commensurate female components are configured to receive the helix 107. The centerlock adaptor 105 is mated to a vehicle hub as discussed herein. The center locking wheel 400 is disposed on the threaded abutment 115, such that the threaded abutment 115 extends through the center bore 405 of center locking wheel 400. The hub adaptor 130 is threadingly engaged to the portion of the threaded abutment 115 that extends through the center bore 405. The center cap 150 is similarly installed within the inner region 124 of the hub adaptor 130. The entire assembly may be tightened to a particular torque specification using the centerlock wrench 300, as provided herein.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

The invention claimed is:

1. A centerlock wheel assembly, comprising:
a centerlock adaptor configured with a plurality of bolt patterns, a flange, and a threaded abutment, the threaded abutment configured to threadingly engage with an interior surface of a hub adaptor;
the centerlock adaptor configured to receive a centerlocking wheel on the threaded abutment;
the hub adaptor configured to retain the center-locking wheel; and
a center cap configured to mate with an inner surface of the hub adaptor, wherein a recessed gear is formed on the center cap.

2. The centerlock wheel assembly of claim 1, further comprising a centerlock wrench comprising a proximal face that features a plurality of ridges that are configured to mate the teeth of the hub adaptor, and a distal face comprising a protruding gear that is configured to mate with the recessed gear of the center cap.

3. A centerlock wheel assembly, comprising:
a centerlock adaptor configured with a bolt pattern, a flange comprising a plurality of bores, and a threaded abutment, the threaded abutment configured to threadingly engage with an interior surface of a hub adaptor;
the centerlock adaptor configured to receive a centerlocking wheel on the threaded abutment;
the hub adaptor configured to retain the center-locking wheel, wherein a plurality of teeth are formed on the hub adaptor; and
a center cap configured to mate with an inner surface of the hub adaptor, wherein a recessed gear is formed on the center cap.

4. A centerlock wheel assembly, comprising:
a centerlock adaptor configured with a plurality of bolt patterns, a flange, and a threaded abutment, the threaded abutment configured to threadingly engage with an interior surface of a hub adaptor;
the centerlock adaptor configured to extend through a center bore of a centerlocking wheel;
the hub adaptor configured to fasten to a portion of the centerlock adaptor extending through the center locking wheel, a plurality of teeth being formed on the hub adaptor;
a center cap configured to mate with an inner surface of the hub adaptor, the center cap comprising a recessed gear formed thereon; and
a centerlock wrench comprising a proximal face that features a plurality of ridges that are configured to mate the teeth of the hub adaptor, and a distal face comprising a protruding gear that is configured to mate with the recessed gear of the center cap.

5. The centerlock wheel assembly of claim 4, wherein the centerlock adaptor is provided with a plurality of vehicle bolt pattern configurations disposed thereon.

\* \* \* \* \*